(12) United States Patent
Sanganeria

(10) Patent No.: US 9,864,500 B2
(45) Date of Patent: Jan. 9, 2018

(54) APPLICATION FOR CONTROLLING AUTO SCROLL OF CONTENT AS A FUNCTION OF TILTING THE DEVICE

(71) Applicant: Mayank Sanganeria, San Francisco, CA (US)

(72) Inventor: Mayank Sanganeria, San Francisco, CA (US)

(*) Notice: Subject to any disclaimer, the term of this patent is extended or adjusted under 35 U.S.C. 154(b) by 49 days.

(21) Appl. No.: 14/751,938

(22) Filed: Jun. 26, 2015

(65) Prior Publication Data

US 2015/0378442 A1    Dec. 31, 2015

Related U.S. Application Data

(60) Provisional application No. 62/017,902, filed on Jun. 27, 2014.

(51) Int. Cl.
*G06F 3/01* (2006.01)
*G06F 3/0485* (2013.01)
*G06F 3/0488* (2013.01)

(52) U.S. Cl.
CPC ........ *G06F 3/0485* (2013.01); *G06F 3/04883* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,056,629 | A * | 10/1991 | Tsuji | B66B 3/00 187/396 |
| 6,624,824 | B1 * | 9/2003 | Tognazzini | G06F 1/1626 345/169 |
| 8,385,971 | B2 * | 2/2013 | Rhoads | G06F 17/30244 382/162 |
| 9,092,070 | B2 * | 7/2015 | Jung | G06F 1/1694 |
| 9,348,435 | B2 * | 5/2016 | Feinstein | G01B 21/22 |
| 9,383,818 | B2 * | 7/2016 | Slonneger | G06F 3/014 |
| 9,483,085 | B2 * | 11/2016 | Griffin | G06F 1/1694 |
| 9,696,809 | B2 * | 7/2017 | Temple | B66B 3/00 187/396 |
| 2013/0111384 | A1 * | 5/2013 | Kim | G06F 3/048 715/765 |

* cited by examiner

*Primary Examiner* — Van Chow

(57) ABSTRACT

A system and method for displaying content on a display device by using a combination of an initial scroll speed set by an explicit action, preferably flicking the screen, and the subsequent change of scroll speed by controlling the difference of the tilt of the device from a reference orientation.

9 Claims, 7 Drawing Sheets

APPLICATION FOR CONTROLLING AUTO SCROLL OF CONTENT AS A FUNCTION OF TILTING THE DEVICE

RELATED APPLICATIONS

This application claims priority to U.S. Provisional Patent Application No. 62/017,902, filed Jun. 27, 2014, the disclosures and teachings of which are incorporated herein by reference.

FIELD OF THE INVENTION

The present invention relates to the control of a scrollable display device with a screen by using a combination of a scroll direction and a scroll speed both set together by a user and a tilt angle of the device in relation to a reference orientation. The present invention allows for a users to control their display device using a combination of a scroll direction and a scroll speed set by them, preferably by a natural flicking movement anywhere on the display screen of the device, and then further refining the scroll speed by further tilting their device relative to the reference orientation. The present invention was never ever obvious and therefore had to be invented as done now.

BACKGROUND

There are a large number of mobile, digital devices like e-readers, gaming consoles, smartphones and tablet computers that are used to view various kinds of content including, but not limited to, books, webpages, images, and lists and collections of said content or representation of such content. In many cases, the content is larger than can be conveniently viewed on the screen of the device. Users then use different means to move the visible portion of the content on the screen, such as pressing their finger to the screen and moving their finger across the screen to view the portion of the content that they wish to view.

A disclosed embodiment of the present invention is an application that utilizes a scrollable display on a device, such as those found on smartphones and tablet devices like the iPhone, iPad, and Android phones and tablet computers. In situations where a user is viewing content that cannot be conveniently viewed on the screen of the device, the content is usually displayed in parts. The application controls the portion of the content displayed by taking a first input from the user, in this case, an initial scrolling direction and an initial scrolling speed determined by the user dragging his/her finger across the screen (as is usually done for scrolling purposes). Further, the application uses this first input to continually change the visible portion of the content according to a speed set by the first input. For adjustments to this speed, the user may either provide another input to restart or stop the process, or may simply tilt the device. At periodic intervals, the difference in orientation of the device and a reference orientation are compared, and thus the speed is controlled based on the tilt. The scrolling continues until either there is another gesture detected on screen, or until the screen reaches the end of the content. Either of these stops the automatic scroll until the user uses another natural flick anywhere on the screen to start it again.

DESCRIPTION OF PRIOR ART

There are many known ways of scrolling through content on a digital mobile device with a scrollable display. One method is by the manipulation of an indicator on a scroll bar positioned vertically and/or horizontally next to the content. Another is by pressing buttons provided on the display screen to move the content up, down, or to the side. Another method is by using a finger to flick the content on the screen in a certain direction to scroll an amount indicated by the length of the flick and the time taken to perform that flick. The flick is performed either by a stylus or other pointing device, or using a finger. In most embodiments of this method, the scroll continues for a small time period after the flick where the scrolling slows down and comes to a stop. Another method allows a user to control the scrolling speed relative to the tilt of the device, but without accounting for changes in the orientation of the device or viewing angle relative to the user.

The methods described above, with the exception of tilt-scrolling, respond to an explicit action by the user to scroll a limited amount. In order to scroll through large amounts of information, the user is required to repeatedly perform an action. For such cases, there is a need to reduce the number of actions that a user is required to perform to scroll through large amounts of information.

Previous embodiments of tilt-scrolling allow the user to control the scroll speed as a function of the amount of tilt placed on the device, and therefore keep scrolling without having to repeatedly perform specific actions. However, this method alters the viewing angle of the device with respect to the user. The sensitivity of the scroll speed with respect to the tilt could cause the scroll speed to change rapidly with the tilt, and small variations to the tilt that occur naturally while viewing the content, and are unintended to change the speed of the scroll, end up significantly changing the speed of the scroll and hence produce undesirable behavior. Conversely, if the scroll speed changes slowly with respect to the tilt, the user is forced to tilt the device by a large amount to achieve comfortable scroll speeds, resulting in an uncomfortable viewing angle.

Additionally, many embodiments of tilt-scrolling allow the user to set a reference orientation only by performing a specific action like pressing a button or switching tilt-scroll on and off through a user interface switch. This action is different than the typical actions performed during scrolling and hence is another aspect of scrolling that inconveniences the user every time the user changes his/her orientation, thereby also changing the orientation of the mobile device. An example of this is when the user is lying down and then proceeds to get up and start walking. Another example of this is when the user changes the reclining angle on his chair. In each of these cases, there is change in orientation of the device due to the user changing orientation and not as a result of the user's intentions to change the speed of scrolling. After the user is settled in a new orientation, he is now required to perform an explicit action to make the device re-calibrate to the new reference orientation. There is a need for a more convenient way to set the reference orientation of the device.

SUMMARY OF THE INVENTION

A system and method for displaying content on a display device comprising: an initial scroll direction and an initial scroll speed set by an explicit action, preferably flicking the screen; and a subsequent scroll speed wherein the subsequent scroll speed is controlled by the tilt of the device from a reference orientation wherein the system for automatically scrolling content on the display. The scrolling continues until either there is another gesture detected onscreen, or until the screen reaches the end of the content.

BRIEF DESCRIPTION OF THE DRAWINGS

The objects, features and advantages of the system will be apparent from the following description in which.

DETAILED DESCRIPTIONS OF THE DRAWINGS AND THE PREFERRED EMBODIMENT

The present invention provides a system and method that aims to overcome current problems in scrolling through content on a screen of a device. In the preferred embodiment of the invention, a user scrolls through content on the device by 'flicking' the content in a certain direction. Here, 'flicking' is the act of dragging one's finger across the screen. The speed of the flick is the length of the flick divided by the amount of time taken to perform that flick. The speed of the flick is used to set the initial scroll speed of the device. In this way, the user is able to set the scroll speed of the device without having to change orientation of the device. Additionally, whenever the user flicks the screen, the reference orientation is reset to the orientation of the device at the time of the flick. The user can refine the speed of scrolling by changing the orientation of the device. This change in speed is calculated as a function of the difference in angle between the current tilt of the device and a reference tilt that was set during the previous flick of the screen. The effective scroll speed at any moment is therefore a function of the initial scroll speed set by the user and a speed due to the tilt of the device with respect to the reference angle. Tilting in one of the directions would contribute to increasing the effective speed, and tilting in the direction opposite to that would decrease the effective speed. When bigger adjustments in scroll speed are required, the initial scroll speed can be reset again by flicking the screen. The scrolling continues until the end of the content is reached. The user can also cause the scrolling to stop by performing any other gesture on the screen, like a tap. Either of these stops the automatic scroll.

In other embodiments of the invention, there can be additional contributions to the final speed. One such example would be related to making the flick action seem more intuitive. In many current touchscreen devices available, the flick gesture performed by the user sets a scroll speed that starts off proportional to the speed of the flick and accelerates or decelerates automatically. This makes it seem like the screen decelerates before stopping and is closer to the expectation we have from physical objects. In an embodiment that wants to retain this effect, the effective scroll speed at any instant would therefore be a function of the initial scroll speed, the speed due to the tilt of the device, and a third speed that is a function of the speed of the flick which eventually decelerates to zero, or close to zero. This function is often an exponential decay function, but could also be any decreasing function.

Figure 1A:
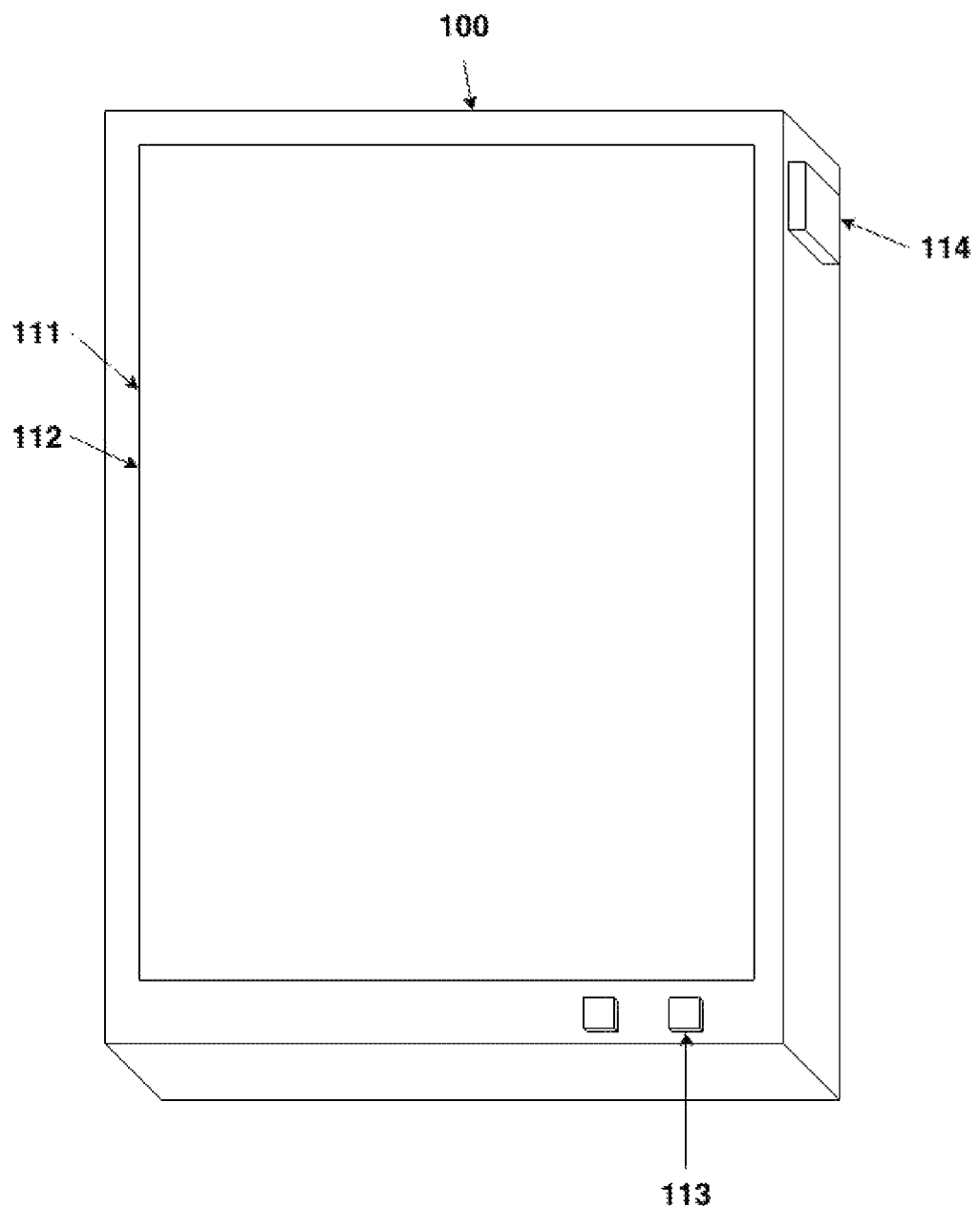
FIG. 1A shows a standard handheld mobile computing device.

FIG. 1A is an illustration of a standard handheld mobile computing device 100. This device consists of a display screen 111 and a touch sensor 112 that can be aligned with the display screen 111. In some embodiments of the mobile computing device 100, touch sensor 112 can have additional physical controls including, but not limited to, buttons or switches 113 present on the front of the device or buttons or switches 114 on either side of the device.

Figure 1B:
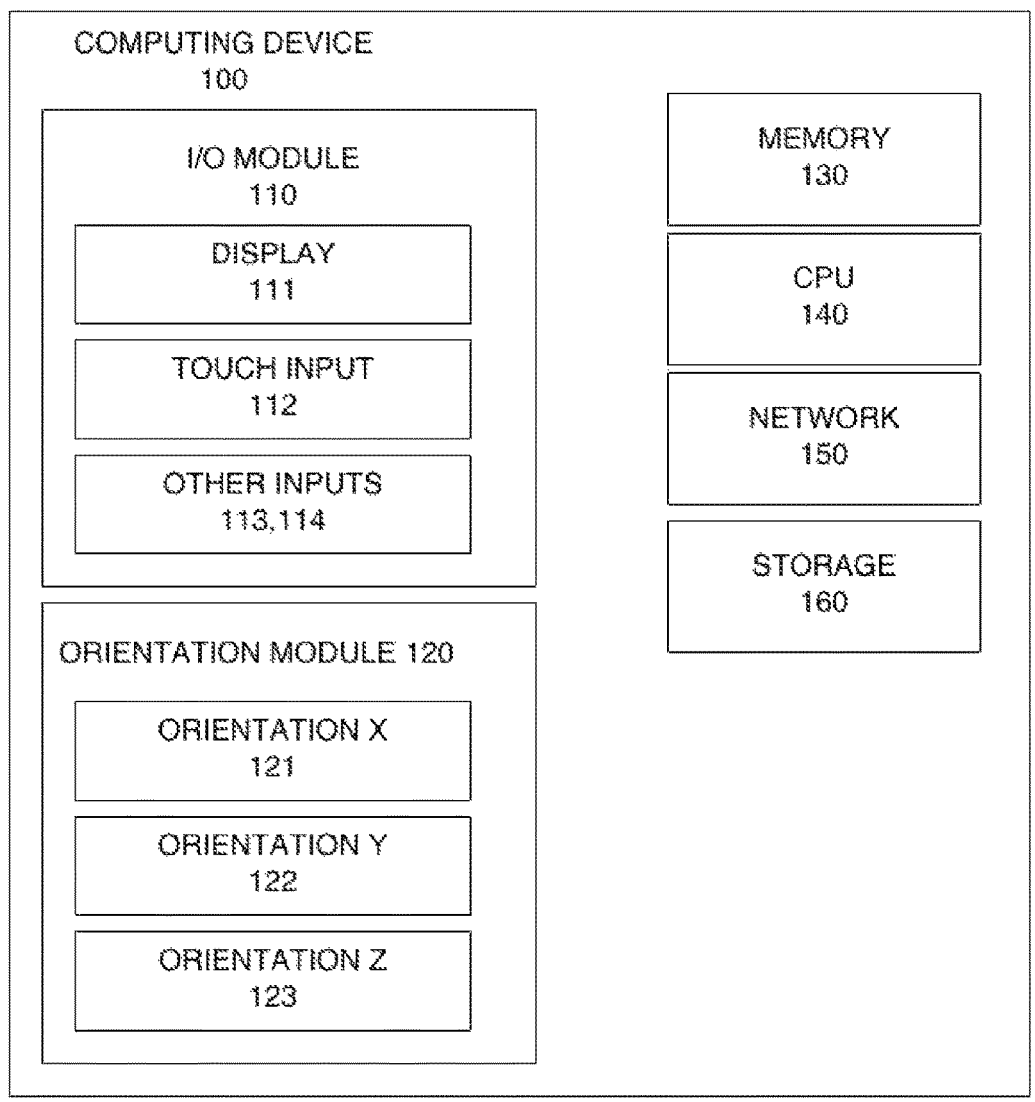
FIG. 1B depicts the system for controlling an embodiment of the computer in FIG. 1.

FIG. 1B is a block diagram of an example of the internal hardware of the mobile computing device shown in FIG. 1A. The computing device 100 consists of an input/output module 110, which consists of the display screen 111 and a touch input sensor 112 that is optionally aligned with the display. The device might also have one or more input controls including, but not limited to, buttons, switches and keyboards. Computing device 100 also consists of an orientation module 120 that can detect the orientation of the computing device 100 in the x-, y-, and z-directions. The orientation module 120 can comprise a combination of accelerometers and gyroscopes, or could comprise other components known in the art. The orientation module 120 provides information about the roll, yaw, and pitch of the device, or movement on the x-, y-, z-axis, respectively. From these inputs, the orientation module 120 is able to detect the orientation of the device.

The mobile computing device 100 also has a memory module 130 which may comprise a single or plurality of read only memory and/or random access memory. Mobile computing device 100 also consists of a processing unit 140 that performs calculations and logic operations to run programs. Mobile computing device 100 optionally has network interface hardware 150 which allows it to communicate with other networks, nodes on networks, computers and devices, and it houses a storage unit 160 which may be hard disks, solid state or flash drives, or access to store and retrieve data from a remote server, among other storage hardware.

Figure 2:
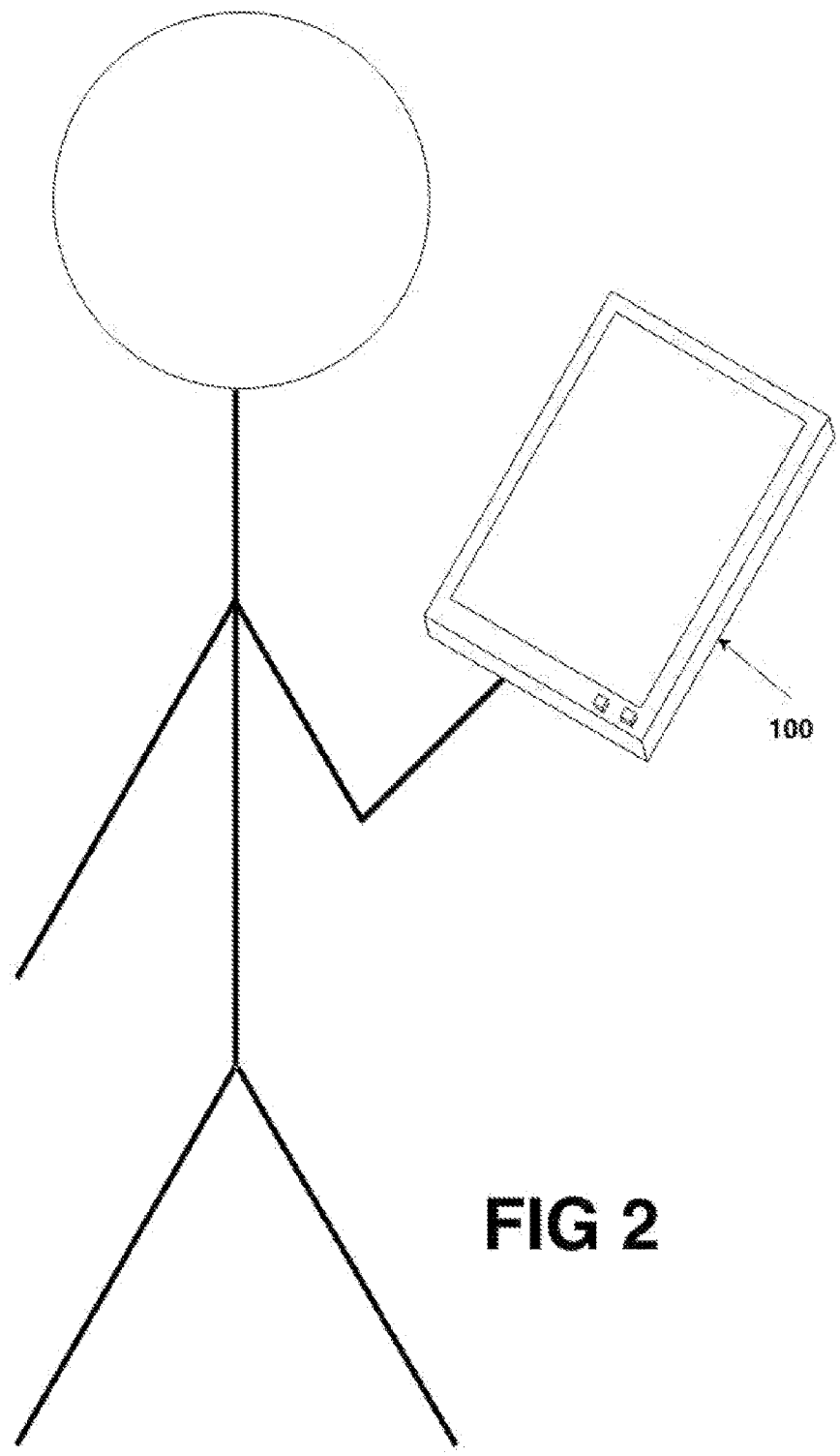
FIG. 2 depicts an individual using the mobile device of FIG. 1 in a suggested orientation.

FIG. 2 is an illustration of a person using the computing device 100 and depicts one of the possible orientations and the way in which the person might hold the device.

Figure 3:
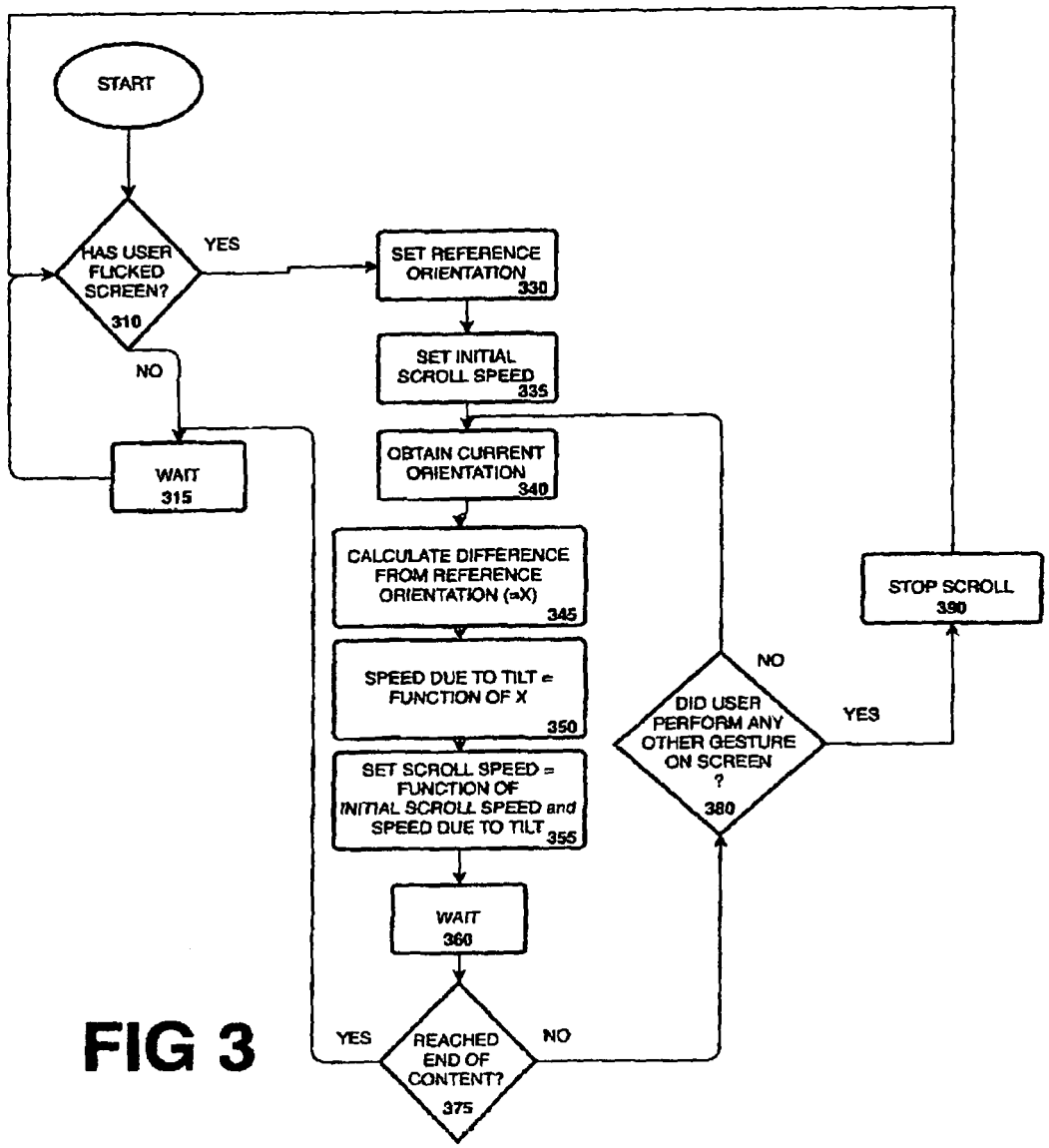
FIG. 3 is an overview of the software for the application in accordance with the present invention.

FIG. 3 is a flowchart of a software implementation in accordance with the application of the present invention. At the start of the process, such as when the device first displays new content, a check is made to see if the user has flicked the screen (310) at all. If not, the application repeats this check (315) at largely periodic intervals until a flick is detected or other relevant input is received. The time interval between these checks can be user-controlled or set to a default.

The method of controlling the scroll (auto-scroll) can be enabled or disabled, either through a software control, a gesture performed by the user, or through physical controls 113 or 114 as shown in FIG. 1. By default, the auto-scroll could be either enabled or disabled. Once a first input has been received, if auto-scroll is disabled, the view window is moved a distance proportional to the flick and then stopped (325), and the app waits for the user to flick the screen again as in step 310. If auto-scroll is enabled, the orientation of the device is detected and it is preferably set to be the reference orientation as in 330. The initial scroll speed can also be set in step 335, and is preferably a function of the flick speed. In an alternate embodiment, the auto-scroll function of the present invention could be initiated automatically upon tilt of the screen, calibrating the speed of the tilt to calculate the speed of the scroll. In this embodiment, the auto-scroll would be the initiating function, while the flicking of the screen, touching of the screen, or pressing of a switch could be used to disable and stop the auto scroll.

Once the current orientation 340 of the mobile computing device 100 is detected, the difference in tilt from the reference orientation (=X) is calculated as in step 345. In step 350, the speed due to tilt as a function of X is calculated, as in step 345. The scroll speed of the display window is set to be a function of the initial scroll speed (obtained in step 335) and speed due to tilt (obtained in step 350). The display is scrolled at this speed. After a small interval 360, the application determines if the screen has reached the end of the content. If so, the application will stop scrolling as in step 375. If not, the application preferably monitors the tilt set against the previously set reference and accordingly sets the scroll speed as in step 355. However, when the user flicks the screen again, the reference orientation is preferably re-set, as in step 330, and the initial scroll speed is re-set to a new speed as calculated in step 335 before accounting for the speed due to tilt. Then, once the speed due to tilt can is re-calculated, the scrolling speed can be refined as described earlier. If the user performs any other gesture on the screen in step 380, the auto scroll will stop as in step 390 and again wait for the user to flick the screen again.

Figure 4:
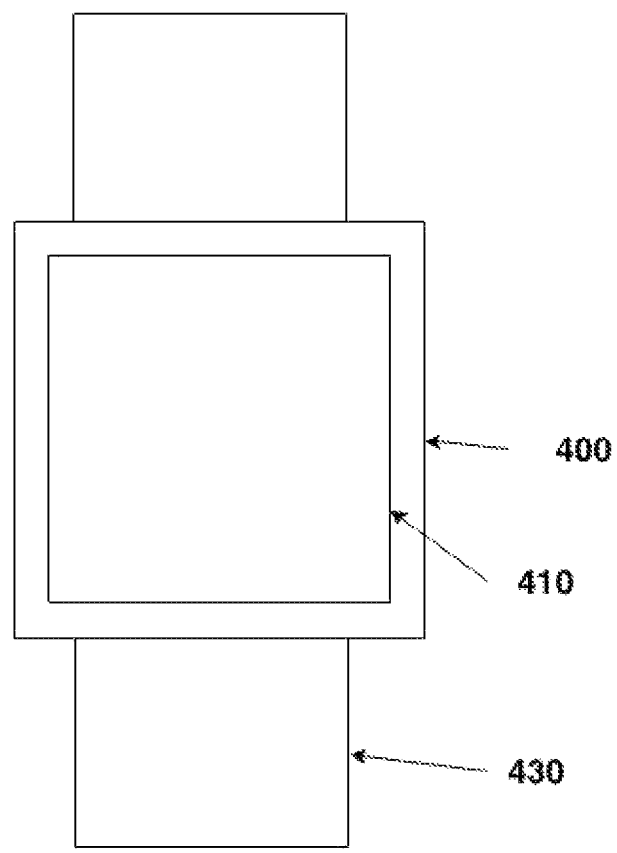
FIG. 4 is an illustration of a wearable computer with the application of the present invention.

FIG. 4 is an illustration of an alternate embodiment of the present invention, namely a wearable device 400 configured with the application in accordance with the present invention, in this case with a form factor similar to a wrist watch. Wearable device 400 preferably consists of a display 410 and a touchscreen sensor aligned with the display 410. The device has straps 430 to enable the user to wear the device. In this embodiment, the wearable device uses the above described method of controlling the scroll speed, and is adapted to configure the speed of auto scroll in accordance with the orientation of the device and the speed of the tilt, in a manner described above with reference to FIG. 3.

Figure 5:
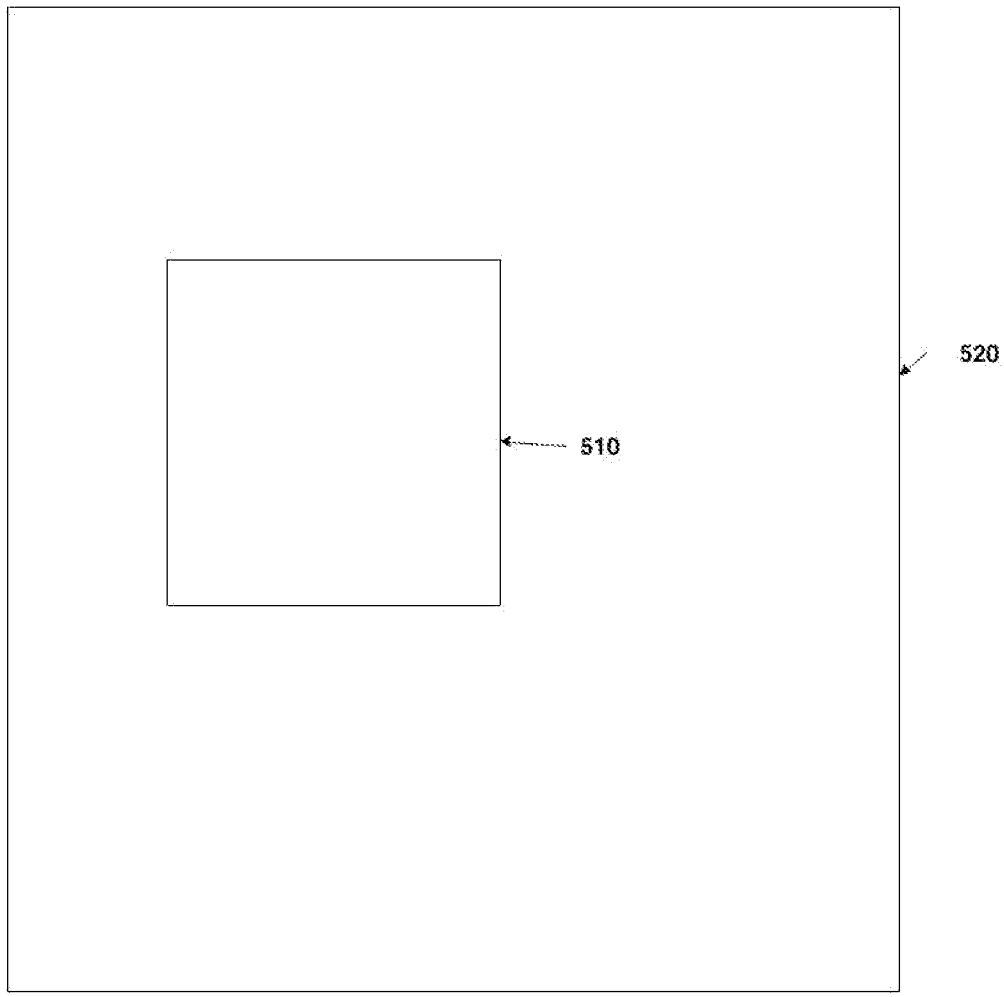
FIG. 5 illustrates a viewing window that can be scrolled over a large two-dimensional document.

FIG. 5 illustrates a large two-dimensional content 520 as viewed through a display window 510. The content 520 could represent a document, an image, a map, or a list or collection of said content or representation of said content, or any other layout of content that is larger than the viewing window 510. The viewing window 510 can be scaled, as is common in many mobile devices, where the content size is larger than the viewing window 510 and thus the content cannot all be conveniently viewed at once. Movement (or scrolling) of the viewing window 510 showing content 520 can be done in accordance with the above described method of calculating and controlling the auto scroll.

In another embodiment, in addition to the auto-scroll, the type of content can determine further parameters that control the speed of scroll. For example, when scrolling through a list of elements, like a newsfeed or a chat program, the speed of the scroll can be decelerated or accelerated at an appropriate element, or in an interactive webpage, the scrolling can be accelerated or decelerated at interactive elements like buttons, clickable content, hyperlinks, etc. The user may also use a separate gesture such as tilting the device in a transverse direction to the direction of scrolling, shaking the device, speaking a voice command, etc., to stop scrolling or 'lock' onto a specific content. Further, if the entire content may be conveniently viewed on the display device, then the auto-scroll application may automatically disable scrolling, or apply the auto-scroll method to a scrollable element of the content.

Figure 6:
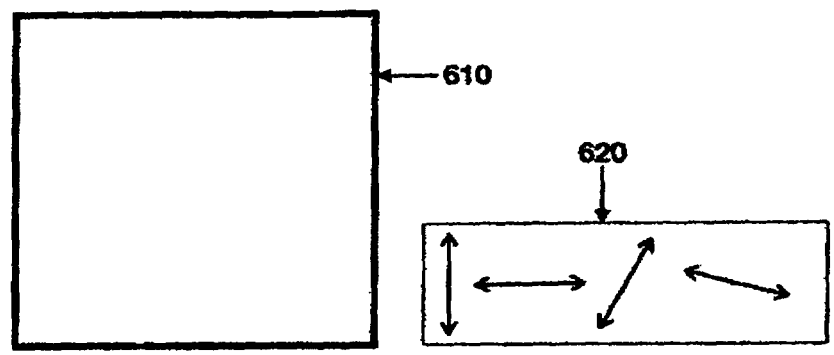
FIG. 6 depicts some of the left-right, up-down, and diagonal directions relative to the screen in which the automatic scrolling can be performed.

In another embodiment, for content that extends in horizontal and vertical directions, the auto-scroll method may be applied to both the horizontal and the vertical axes of the display, with the horizontal auto-scroll being controlled by the speed of the horizontal flick and the change in tilt, and similarly for the vertical auto-scroll. This allows the scrolling to be performed in, any direction on the screen as shown in FIG. 6. The screen is shown as 610. Some of the directions in which the scrolling can be performed are depicted in the box 620.

In another embodiment, if there is a nesting of scrollable content, for example a chat window in a webpage, the auto-scroll method may be applied to the inner element, in the quoted example, scrolling the chat window instead of the entire webpage. Further, if the nested scrollable content is scrollable in a direction different from the entire content, then the auto-scroll may use the flick speed and change in tilt in the appropriate distinct directions to enable scrolling of both contents.

Thus, the present invention discloses an apparatus, methods, systems, and programs using an application to create an auto scroll technique as a combination of setting an initial scroll speed and further controlling the scroll speed as a function of tilt of the viewing device.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

What is claimed is:

1. A system for displaying content on a display device with a screen comprising: an initial scroll direction and an initial scroll speed, both set together by one explicit action by a user; and a subsequent scroll speed wherein the subsequent scroll speed is controlled by a tilt of the device from a reference orientation wherein the system for automatically scrolling content on the device:
   a uses a natural flick when the flick is detected on the screen to set its initial direction and initial scroll speed, starts non-stop automatic scrolling, and stops scrolling only at the end of the content;
   b sets the orientation of the device at the time of the flick as the reference orientation;
   c uses changing angles of the tilt compared to the reference orientation to control the subsequent scroll speed; and
   d uses any other gesture on the screen when detected or reaching end of the content to be displayed to stop the scrolling.

2. A system as described in claim 1 wherein said flick on the screen is in a left, right, up, down or any diagonal direction with respect to the content on the screen.

3. A system as described in claim 1 wherein said subsequent scroll speed is further determined by additional parameters.

4. A system as described in claim 1 wherein said scroll speed is applied to a portion of the elements on the screen.

5. A system as described in claim 1 wherein said device is a tablet.

6. A system as described in claim 1 wherein said device is a smart watch.

7. A system as described in claim 1 wherein said device is a phone.

8. A system as described in claim 7 wherein said device is a smart phone.

9. A method as described in claim 1 wherein said reference orientation is the orientation of the device at the time of the initial flick.

\* \* \* \* \*